Patented Dec. 15, 1936

2,064,752

UNITED STATES PATENT OFFICE 2,064,752

PRESERVATION OF RUBBER

Joseph R. Ingram, Nitro, W. Va., assignor, by mesne assignments, to Monsanto Chemical Company, St. Louis, Mo., a corporation of Delaware No Drawing. Application March 12, 1934, Serial No. 715,157

14 Claims. (Cl. 18—50)

The present invention relates to the art of rubber manufacture, and particularly relates to the preparation of rubber compounds which resist deterioration due to the effects of light, heat and/or oxygen. In has long been known that such deterioration can be retarded to a certain degree by treating the rubber either before or after vulcanization with certain substances known as age-resisters or antioxidants. One object of this invention is to provide a new and superior class of antioxidants for rubber. A further object of this invention is to provide a new and superior class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual service.

The age resisting characteristics of a vulcanized rubber product can be readily ascertained by subjecting portions of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending on the condition of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

According to the present invention, a new class of antioxidants or age-resisters has been found which, upon incorporating into a rubber stock, imparts exceptional age resisting qualities and flex cracking resistance to the vulcanized rubber product. The compounds herein disclosed as coming broadly within the scope of the present invention are obtainable by treating a reaction product of a ketone, as for example acetone, and an aromatic amine preferably free from substituents para to the amino group, as for example aniline, with a strong acid, preferably a mineral acid as for example hydrochloric acid.

As a specific embodiment of the present invention 100 parts by weight of a product formed by reacting acetone and aniline comprising 2,2,4-trimethyl-dihydro-quinoline (see Reddelien and Thurm, Berichte der deutschen chemischen Gesellschaft, vol. 65, pages 1511–1521 (1932) were treated with 55 parts by weight of concentrated hydrochloric acid and heated therewith for 20 hours at a temperature of substantially 85° to 90° C. The crystalline salt-like product first produced changed to an amorphous mass, which on cooling formed a brittle solid. The material so obtained, being acid in nature, was preferably neutralized before being incorporated in rubber. This was conveniently accomplished by adding said product to a benzene-caustic soda solution. After neutralization was completed, the alkaline layer was separated from the solvent which contains the preferred material dissolved therein. On removing the solvent, the brittle solid so produced, melting at substantially 100° to 118° C., was incorporated in a rubber tread stock comprising

|  | Parts of |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl-thiobenzoate | 0.8 |
| Diphenyl guanidine | 0.2 |
| The antioxidant described above | 1.0 |

After vulcanizing the stock so compounded, portions thereof were aged in the oxygen bomb for 96 hours at a temperature of 70° C. and an oxygen pressure of 300 pounds per square inch. The tensile and modulus characteristics of the aged and unaged vulcanized rubber products follow.

Table I

| Cure mins. | Steam pressure lbs/in² | Hrs. aged | Modulus of elasticity in lbs/in² at elongations of— | | Tensile at break in lbs/in² | Ult. elong. % |
|---|---|---|---|---|---|---|
|  |  |  | 300% | 500% |  |  |
| 75 | 30 | 0 | 2120 | 4180 | 4180 | 500 |
| 75 | 30 | 96 | 1920 |  | 2375 | 370 |
| 90 | 30 | 0 | 2170 | 4245 | 4245 | 500 |
| 90 | 30 | 96 | 1900 |  | 2605 | 420 |
| 105 | 30 | 0 | 2210 | 4340 | 4340 | 500 |
| 105 | 30 | 96 | 1930 |  | 2775 | 460 |

The data given in Table I show that the preferred class of material possess superior aging properties. Furthermore, stocks, wherein the preferred material was incorporated, were found to be markedly resistant to cracking of the rubber due to flexing, as determined in the manner hereinbefore set forth. The rubber stocks containing the preferred class of materials were found to be of particular value as resistant to flex cracking after said stocks were aged. Thus, portions of the cured rubber product were aged three days in the Geer oven at 70° C. and then flexed in the manner hereinbefore set forth. The stocks wherein the preferred material was incorporated were found to be markedly resistant to flex cracking and much superior in this respect to those rubber stocks containing untreated 2,2,-4-trimethyl-dihydro-quinoline.

Other quantities of hydrochloric acid may be employed in the preparation of the preferred antioxidant than that hereinbefore set forth. Thus, 100 parts by weight of 2,2,4-trimethyl-dihydro-quinoline have been treated with 10, 15, 25, and 30 parts by weight of concentrated hydrochloric acid in a manner analogous to that described above wherein 55 parts by weight of acid were employed, and the product so obtained incorporated in the rubber tread stock set forth above with an improvement in the flexing and aging properties thereof. Further, other acids than hydrochloric acid may be so employed. Thus, I may employ sulfuric acid. Again the periods of heating may be varied.

The preferred class of materials are also resistant to the deteriorating influences of light. Thus one part of the reaction product of 100 parts of 2,2,4-trimethyl-dihydro-quinoline and 55 parts by weight of concentrated hydrochloric acid was incorporated in a white rubber stock comprising—

|  | Parts of |
|---|---|
| Pale crepe rubber | 100 |
| Zinc oxide | 60 |
| Lithopone | 20 |
| Sulfur | 2 |
| Paraffin | 0.25 |
| Benzothiazyl-thiobenzoate | 0.825 |
| Diphenyl guanidine phthalate | 0.675 |

The stock so compounded was vulcanized by heating for 30, 45 and 60 minutes at 20 pounds of steam pressure per square inch. Portions of the vulcanized rubber product on exposing to ultra violet light rays generated by a mercury arc light maintained nine inches from the rubber strips for 30 hours, showed little discoloration at the end of the test. It is thus shown that the preferred class of materials have the added advantage that they can be employed in light colored stocks wherein most of the commercial antioxidants cannot be used owing to their discoloring effect.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the ones specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims atttached hereto as part of the present specification.

What is claimed is:

1. The method of preserving rubber which comprises treating rubber with a product obtainable by heating 2,2,4-trimethyl-dihydro-quinoline with a strong non-oxidizing mineral acid.

2. The method of preserving rubber which comprises treating rubber with a product obtainable by heating 2,2,4-trimethyl-dihydro-quinoline with hydrochloric acid.

3. The method of preserving rubber which comprises treating rubber with a product obtainable by heating substantially 100 parts by weight of 2,2,4-trimethyl-dihydro-quinoline with substantially 10 to 55 parts by weight of concentrated hydrochloric acid.

4. The method of preserving rubber which comprises treating rubber with a product obtainable by heating substantially 100 parts by weight of 2,2,4-trimethyl-dihydro-quinoline with substantially 55 parts by weight of concentrated hydrochloric acid.

5. A composition comprising rubber and a product obtainable by heating 2,2,4-trimethyl-dihydro-quinoline with a strong non-oxidizing mineral acid.

6. A composition comprising rubber and a product obtainable by heating 2,2,4-trimethyl-dihydro-quinoline with hydrochloric acid.

7. A composition comprising rubber and a product obtainable by heating substantially 100 parts by weight of 2,2,4-trimethyl-dihydro-quinoline with substantially 10 to 55 parts by weight of concentrated hydrochloric acid.

8. A composition comprising rubber and a product obtainable by heating substantially 100 parts by weight of 2,2,4-trimethyl-dihydro-quinoline with substantially 55 parts by weight of concentrated hydrochloric acid.

9. The vulcanized rubber product prepared by heating rubber and sulfur in the presence of a product obtainable by heating 2,2,4-trimethyl-dihydro-quinoline with a strong non-oxidizing mineral acid.

10. The vulcanized rubber product prepared by heating rubber and sulfur in the presence of a product obtainable by heating 2,2,4-trimethyl-dihydro-quinoline with hydrochloric acid.

11. The vulcanized rubber product prepared by heating rubber and sulfur in the presence of a product obtainable by heating substantially 100 parts by weight of 2,2,4-trimethyl-dihydro-quinoline with substantially 10 to 55 parts by weight of concentrated hydrochloric acid.

12. The vulcanized rubber product prepared by heating rubber and sulfur in the presence of a product obtainable by heating substantially 100 parts by weight of 2,2,4-trimethyl-dihydro-quinoline with substantially 55 parts by weight of concentrated hydrochloric acid.

13. The method of preserving rubber which comprises treating rubber with a product obtainable by heating 2,2,4-trimethyl-dihydro-quinoline with a strong non-oxidizing mineral acid at a temperature of substanstially 85° to 90° C. and neutralizing the resultant product.

14. The method of preserving rubber which comprises treating rubber with a product obtainable by heating substantially 100 parts by weight of 2,2,4-trimethyl-dihydro-quinoline with substantially 10 to 55 parts by weight of concentrated hydrochloric acid at a temperature of substantially 85° to 90° C. and neutralizing the resultant product.

JOSEPH R. INGRAM.